United States Patent
Böhm

(10) Patent No.: US 6,209,689 B1
(45) Date of Patent: Apr. 3, 2001

(54) METHOD AND SYSTEM FOR ACTUATING AN ELECTROMECHANICALLY OPERABLE PARKING BRAKE FOR AUTOMOTIVE VEHICLES

(75) Inventor: Jürgen Böhm, Oberneisen (DE)

(73) Assignee: Continental Teves AG & Co., OHG, Frankfurt (DE)

(*) Notice: Subject to any disclaimer, the term of this patent is extended or adjusted under 35 U.S.C. 154(b) by 0 days.

(21) Appl. No.: 09/554,831

(22) PCT Filed: Nov. 20, 1998

(86) PCT No.: PCT/EP98/07467

§ 371 Date: Jul. 7, 2000

§ 102(e) Date: Jul. 7, 2000

(87) PCT Pub. No.: WO99/26829

PCT Pub. Date: Jun. 3, 1999

(30) Foreign Application Priority Data

Nov. 22, 1997 (DE) .............................. 197 51 904

(51) Int. Cl.[7] .............................. B60T 13/74; B60T 7/12
(52) U.S. Cl. .......................... 188/156; 188/158; 188/162; 188/1.11 E; 188/106 F; 188/106 P; 188/71.8; 303/20
(58) Field of Search .................... 188/156, 158, 188/162, 181 T, 1.11 E, 71.8, 2 D, 106 F, 106 P, 106 R, 106 A, 72.1, 72.8, 72.6; 303/20, 13–18, 112, 3, 155; 74/388 R, 471 R, 625; 318/266, 362, 468

(56) References Cited

U.S. PATENT DOCUMENTS

| | | | |
|---|---|---|---|
| 4,546,296 | * 10/1985 | Washbourn et al. | 188/162 |
| 4,602,702 | * 7/1986 | Ohta et al. | 303/20 |
| 4,651,852 | * 3/1987 | Wickham et al. | |
| 4,658,939 | * 4/1987 | Kircher et al. | 188/156 |
| 4,804,073 | * 2/1989 | Taig et al. | 188/72.1 |
| 4,809,824 | * 3/1989 | Fargier et al. | 188/162 |
| 4,850,459 | * 7/1989 | Johannesen et al. | 188/156 |
| 4,928,543 | * 5/1990 | Johannsen et al. | 188/156 |

(List continued on next page.)

FOREIGN PATENT DOCUMENTS

| | | |
|---|---|---|
| 19526645 | 1/1997 | (DE) . |
| 19536694 | 4/1997 | (DE) . |
| 9703869 | * 2/1997 | (WO) . |
| 9712793 | * 4/1997 | (WO) . |

*Primary Examiner*—Douglas C. Butler
(74) *Attorney, Agent, or Firm*—Rader, Fishman & Grauer PLLC

(57) ABSTRACT

The present invention relates to a method for actuating a parking brake which is electromechanically operable by an actuator by way of a force-transmitting element, the actuator being composed of an electric motor and a self-locking gear which is interposed between the electric motor and the force-transmitting element, and it also relates to a system for actuating an electromechanically operable parking brake. To permit an adjustment of necessary actuating force nominal values, according to the present invention, the current to be supplied to the actuator and the actuator position are evaluated to determine a voltage that is to be applied to the actuator corresponding to the desired actuating force and the actuating force gradient.

14 Claims, 2 Drawing Sheets

U.S. PATENT DOCUMENTS

| | | | |
|---|---|---|---|
| 4,941,553 | * | 7/1990 | Harrison .................. 188/156 |
| 4,953,668 | * | 9/1990 | Severinsson ............. 188/158 |
| 4,995,483 | * | 2/1991 | Moseley et al. ......... 188/162 |
| 5,004,077 | * | 4/1991 | Carlson et al. . |
| 5,024,299 | * | 6/1991 | Shaw et al. .............. 188/156 |
| 5,092,432 | * | 3/1992 | Taig . |
| 5,148,894 | * | 9/1992 | Eddy, Jr. ................. 188/106 F |
| 5,178,237 | * | 1/1993 | Ursel et al. .............. 188/106 P |
| 5,180,038 | * | 1/1993 | Arnold et al. . |
| 5,293,517 | * | 3/1994 | Andruet ................... 318/362 |
| 5,310,026 | * | 5/1994 | Shaw et al. .............. 188/156 |
| 5,590,744 | * | 1/1997 | Belmond . |
| 5,704,693 | * | 1/1998 | Mackiewicz .............. 303/20 |
| 5,769,189 | * | 6/1998 | Heibel et al. ............ 188/156 |
| 5,785,157 | * | 7/1998 | Scott et al. .............. 188/156 |
| 5,913,390 | * | 6/1999 | Hostetler ................. 188/156 |
| 5,949,168 | * | 9/1999 | Dieckmann et al. ..... 188/71.7 |
| 5,952,799 | * | 9/1999 | Maisch et al. ........... 303/20 |
| 5,957,246 | * | 9/1999 | Suzuki ..................... 188/162 |
| 6,000,507 | * | 12/1999 | Böhm et al. ............. 188/158 |
| 6,012,556 | * | 1/2000 | Blosch et al. ............ 188/162 |
| 6,015,194 | * | 1/2000 | Decker ..................... 303/20 |
| 6,019,436 | * | 2/2000 | Siepker .................... 188/156 |
| 6,030,054 | * | 2/2000 | Doericht .................. 303/20 |
| 6,075,332 | * | 6/2000 | McCann . |
| 6,079,794 | * | 6/2000 | Drott ........................ 303/20 |

* cited by examiner

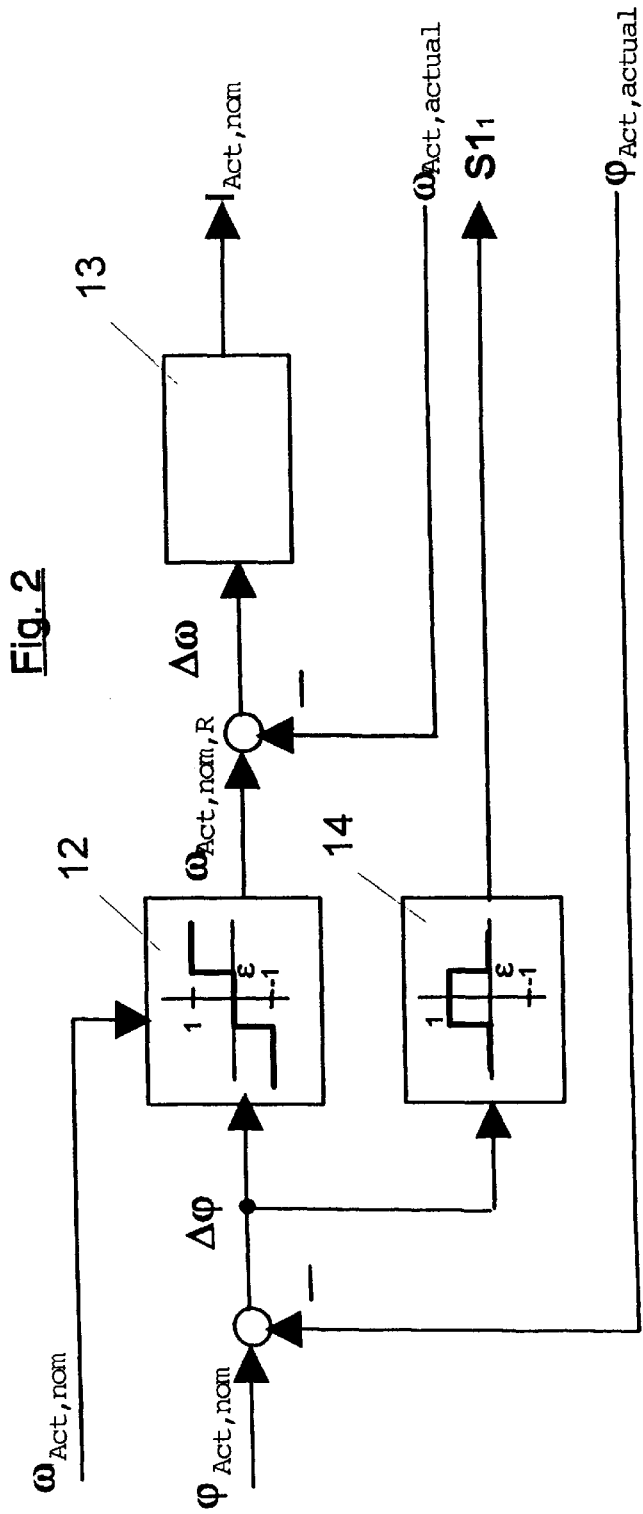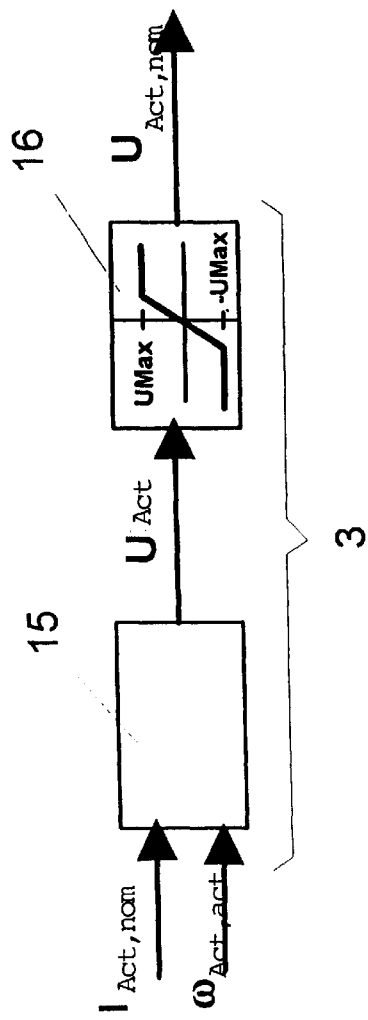

METHOD AND SYSTEM FOR ACTUATING AN ELECTROMECHANICALLY OPERABLE PARKING BRAKE FOR AUTOMOTIVE VEHICLES

TECHNICAL FIELD

The present invention generally relates to vehicle brakes and more particularly relates to a method for actuating a parking brake which is electromechanically operable by an actuator.

BACKGROUND OF THE INVENTION

German published patent application DE 19414046, for example, discloses an electromechanically operable parking brake of this general type. The special feature of the prior art parking brake includes that the rotor of the electric motor has a hollow or tubular design and radially embraces the gear unit. This method permits achieving an actuating unit which exhibits a small axial overall length. However, the state of the art mentioned does not indicate how the actuating unit is driven.

An object of the present invention is to disclose a method and a system for actuating an electromechanically operable parking brake which permits adjusting necessary nominal values of the actuating force. Another object of the present invention involves disclosing a method and a system which allow release of the parking brake and adjustment of the lining clearance. Still another objective is directed to monitoring the proper function or monitoring that predetermined limit values (such as maximum current, power requirement) are maintained.

According to the present method, this object is achieved in that the current to be supplied to the actuator and the actuator position are evaluated in order to determine the voltage that is to be applied to the actuator corresponding to the desired actuating force and the actuating force gradient.

To render the idea of the present invention more precise, a desired actuator position and a desired actuator rotational speed is associated with the desired actuating force and its gradient by function control and monitoring.

In this arrangement, the desired actuator position and the desired actuator rotational speed are preferably subjected to a position control in order to produce a signal representative of the actuator current nominal value.

The voltage that is to be applied to the actuator is preferably calculated by evaluating the signal representative of the desired actuating current value in consideration of a signal representative of the actuator rotational speed actual value.

Another favorable feature of the method of the present invention includes that a second voltage value, which preferably amounts to 0 volt, can be applied to the actuator in dependence on a switching variable.

The switching variable can be set by the function control and monitoring system due to error and/or functional reasons, or by the position control due to functional reasons.

An actuation system according to the present invention for implementing the above-mentioned method is characterized in that a) there is provision of a function controlling and monitoring module which is furnished, as input quantities, with nominal values of the actuating force and signals representative of the actuating force gradient, with a signal representative of the actual actuator position, and a signal representative of the actual actuator current, and which produces from the input quantities the nominal value of the actuator rotational speed, the nominal value of the actuator position and the actual value of the actuator rotational speed, b) there is provision of a position controller which is furnished, as input quantities, with the signals that correspond to the nominal and actual value of the actuator rotational speed and the nominal and actual value of the actuator position, and which provides the signal representative of the actuator current nominal value, and c) connected downstream of which is a calculating module in which the signal representative of the actuator current nominal value is converted into the desired voltage that is to be applied to the actuator, and in which there occurs a compensation of the opposing electromagnetic force generated by the actuator, in consideration of the actual value of the actuator rotational speed.

In this arrangement, it is assumed that elements which exhibit a self-locking effect are provided in the electromechanical driving track. A simplified control structure compared to a system without self-locking is achieved by specifically utilizing the self-locking effect in the actuator activation. It is not required to actuate the electric parking brake in a controlled way when a predetermined target position or target force is reached; it may rather be brought to a standstill in a simple manner by the influence of a great degree of static friction. Due to the self-locking effect, the parking brake will remain in this position also in the deenergized condition.

In a preferred aspect of the actuation system of the present invention, switching means are connected downstream of the calculating module which permit applying a second voltage value to the actuator, that is preferably 0 volt, in dependence on a switching variable.

In another embodiment of the system of the present invention, the output signal of the switching means is sent to an electronic actuating circuit (servo booster) whose output signal is used to drive the actuator.

BRIEF DESCRIPTION OF THE DRAWINGS

FIG. 2 is a view of the design of the position controller used in the control system of FIG. 1.

FIG. 3 is a view of the design of the calculating module used in the control system of FIG. 1 for calculating the desired actuator voltage.

DETAILED DESCRIPTION OF THE PREFERRED EMBODIMENTS

Figure 1:
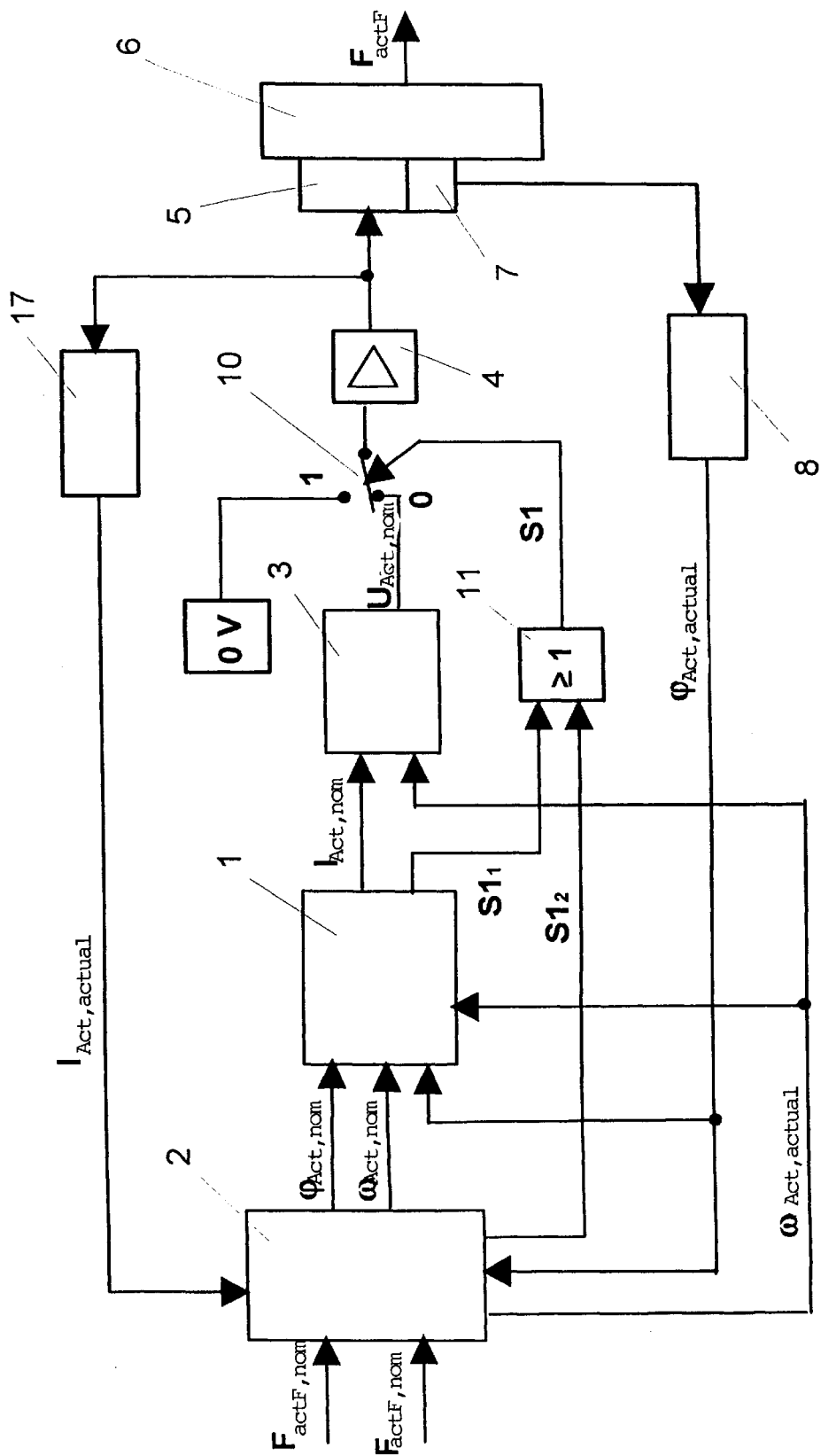
FIG. 1 is an embodiment of a control system for implementing the method of the present invention.

The following description relates to an electric drum brake for better understanding the principle. However, it is also possible to employ the present method without modification in other electrically operated brakes.

The control system illustrated in FIG. 1 is mainly composed of a position controller 1, a function controlling and monitoring module 2 connected upstream of the position controller 1, a calculating module 3 connected downstream of the position controller 1, a switch 10 connected downstream of the calculating module 3, as well as a servo booster 4 connected downstream of switch 10. The output signal $I_{Act,actual}$ of the servo booster which corresponds to the actuator current actual value is used to drive an actuator 5 (shown only schematically) of an electromechanically operable parking brake which is assigned reference numeral 6. The actuator is preferably equipped with a position measuring system 7 whose output signal $\phi_{Act,actual}$ is sent to the function controlling and monitoring module 2, on the one hand, and to the position controller 1, on the other hand, by way of a position signal conditioning circuit 8. The signal $I_{Act,actual}$ which corresponds to the actuator current actual value is sent as an input quantity to the function controlling and monitoring module 2 by means of a current measuring device 17.

The actuation of the above-mentioned electromechanically operable parking brake 6 is based on force control. In this control, a nominal value for the actuating force $F_{actF,nominal}$ to be adjusted is predetermined by an operating element or a superior system unit, or is sent to the function controlling and monitoring module 2 which additionally contains a nominal value of the actuating force gradient $\dot{F}_{actF,nominal}$. The signals which correspond to the actuator position actual value $\phi_{Act,actual}$ and the actuator current actual value $I_{Act,actual}$ are still sent to the above-mentioned module 2 as further input quantities. In the function controlling and monitoring module 2, the actuator position nominal value $\phi_{Act,nominal}$ and the actuator rotational speed nominal value $\omega_{Act,nominal}$ are calculated by means of a mathematical model which illustrates the relationship between the actuator position $\phi$ and the actuating force $F_{actF}$. The actuator speed nominal value $\omega_{Act,nominal}$ results from the equation $\dot{F}_{actF,nominal}=K_E(\phi_{Act,actual}) \cdot \omega_{Act,nominal}$, wherein $\dot{F}_{actF,nominal}$ designates the actuating force gradient and $K_E$ designates the rigidity of the system so that for the actuator rotational speed nominal value $$\omega_{Act,nominal}=1/K_E(\phi_{Act,actual}) \cdot \dot{F}_{actF,nominal}$$

applies.

In addition, the actuator rotational speed actual value $\omega_{Act,actual}$ is calculated in the function controlling and monitoring module 2 by differentiating the actuator position actual value $\phi_{Act,actual}$ in a filter having a differentiating function.

Besides, the function controlling and monitoring module 2 performs function monitoring and error monitoring operations. Function monitoring is preferably carried out by observing the actuator current actual value $I_{Act,actual}$ during a brake-applying operation. When the actuator current actual value $I_{Act,actual}$ exceeds a maximum permanent current value, the actuation is disabled upon lapse of a defined period of time. Function-induced disconnection is carried out by means of a switching variable $S1_2$ generated by the function controlling and monitoring module 2. In error monitoring the system behavior of the electric parking brake is checked with respect to whether predetermined values are maintained or checked for plausibility by way of $\phi_{Act,nominal}, \phi_{Act,actual}, I_{Act,actual}, F_{actF,nominal}, \dot{F}_{actF,nominal}, \omega_{Act,nominal},$ and $\omega_{Act,actual}$.

The purpose of the position controller 1 connected downstream of the function controlling and monitoring module 2 is to adapt the current actuator position actual value $\phi_{Act,actual}$ to the desired actuator position nominal value $\phi_{Act,nominal}$. In doing so, the actuator position nominal and actual value $\phi_{Act,nominal}$, $\phi_{Act,actual}$, the actuator rotational speed nominal value $\omega_{Act,nominal}$, and, if necessary, the actuator rotational speed actual value $\omega_{Act,actual}$ are sent as input quantities to the position controller 1. The output quantities of the position controller 1 are represented by the actuator current nominal value $I_{Act,nominal}$ and a second switching variable $S1_1$. The actuator current nominal value $I_{Act,nominal}$ is converted in the calculating module 3, in consideration of the actuator speed actual value $\omega_{Act,actual}$, into a signal $U_{Act,nominal}$ representative of the desired voltage that is to be applied to actuator 5. By way of a switch 10, the latter signal is sent to the actuating electronics or the booster 4 that supplies a current value $I_{Act,actual}$ to the actuator 5. The switch 10 is activated by means of a switching variable S1 which either corresponds to the above-mentioned first switching variable $S1_2$ or the second switching variable $S1_1$ that are sent to a logic OR-element 11. In the first switch position illustrated in FIG. 1, the above-mentioned voltage signal $U_{Act,nominal}$ is sent to the booster 4, while a second voltage value, preferably 0 volt, is supplied to the booster 4 in the second switch position of switch 10.

After activation of the controller electronics, the function controlling and monitoring module 2 inputs from a non-volatile memory the condition that was last reached (actuator position, brake applied/released, clearance position). This condition is maintained until a change is initiated by means of the specification $F_{actF,nominal}$. When a parking brake is in a released condition, this position will be maintained as long as $F_{actF,nominal}=0$. The parking brake will then be applied with the specification of a nominal value $F_{actF,nominal}>0$. Initially, a defined test movement is performed during the brake-applying movement in order to detect the lining clearance. When the clearance position is detected, immediate switch-over to position control or force control is made. All other nominal values of the actuating force will then be adjusted in a force-controlled way by means of the position control until the next clearance detection movement is performed.

One possible variant how to realize the position controller 1 mentioned with respect to FIG. 1 is illustrated in FIG. 2. The position controller shown therein is mainly composed of a series connection of a three-point switch 12 and a velocity or rotational speed controller 13. The three-point switch 12, which need not have a symmetrical design, is furnished as an input quantity with the actuator rotational speed nominal value $\omega_{Act,nominal}$ without a sign, to which value is allocated the sign that defines the direction of movement of the actuator 5 in dependence on an actuator position deviation $\Delta\phi=\phi_{Act,nominal}-\phi_{Act,actual}$. The output quantity of the three-point switch 12 is designated by $\phi_{Act,nominal,R}$. The velocity or rotational speed controller 13 which, in the simplest case, can be configured as a linear PI-controller and to which is sent an actuator rotational speed deviation $\Delta\omega=\omega_{Act,nominal,}$ $R$–$\omega_{Act,actual}$ supplies at its output the actuator current nominal value $I_{Act,nominal}$ and, thus, adapts the actuator speed actual value $\omega_{Act,actual}$ sensed or calculated from the actuator position actual value $\phi_{Act,actual}$ to the desired actuator current nominal value $I_{Act,nominal}$.

As can further be taken from FIG. 2, a two-point switch 14 is connected in parallel to the three-point switch 12. Switch 14 is furnished with the value of the actuator position deviation $|\Delta\phi|=\phi_{Act,nominal}-\phi_{Act,actual}$ and provides the above-mentioned switching variable $S1_1$, which can be set due to functional reasons. When the value $|\Delta\phi|$ is within a defined range which is designated by $\epsilon$ in the example shown, the switching variable $S1_1$ will adopt the value of "1", while it corresponds to "0" for all amounts of the value $|\Delta\phi|$ outside the defined range $\epsilon$. The above-mentioned deactivation of the actuator 5 due to functional reasons occurs when the actuator position nominal value $\phi_{Act,nominal}$ is reached caused by the switching variable $S1_1$.

The embodiment of FIG. 3 shows the design of the calculating module 3, connected downstream of the position controller 1, in which the nominal value of the voltage $U_{Act,nominal}$ to be applied to the actuator 5 is calculated. As can be seen in FIG. 3, the calculating module 3 shown therein is composed of a module 15 for the compensation of the electromagnetic opposing force generated by the actuator 5, and a limiter 16 connected downstream of the module 15. Instead of a current regulation, current control is performed in the compensation module 15. It is especially favorable that the loop time for the control of the entire system may be adjusted in conformity with the dynamics requirements of the electromechanic driving track (in the range of 1.5 to 3 msec in this case). The precondition is that the parameters of the actuators 5 (R and $\psi_{EMOF}$ in this case) are known and constant in approximation. Variations of these parameters which are caused e.g. by heat or aging must be correspondingly adapted by a signal-based adaption device which is integrated in the function controlling and monitoring module 2, if necessary. Among others, an adaption of the relationship between actuating force $F_{actF}$ and the actuator position $\phi_{Act}$ can be performed in the adaption device.

In the event of a specification, the actuating force nominal value $F_{actF,nominal}$ is defined by a corresponding signal processing by means of the operating element. A suitable value, for example, $\dot{F}_{actF,nominal,maximum}$, can be adopted for the nominal value of the actuating force gradient $\dot{F}_{actF,nominal}$. When a continuously working operating element, e.g. a potentiometer, is used, the nominal value of the actuating force gradient $\dot{F}_{actF,nominal}$ will result due to the specification. With an operating element of digital operation, for example, a keying device, it is required to make an appropriate value the basis for the nominal value of the actuating force gradient $\dot{F}_{actF,nominal}$.

In the event that a signal representative of the vehicle speed is additionally taken into consideration in the calculation of the actuating force nominal value $F_{actF,nominal}$ for the electric parking brake by way of the signals of the operating element, it is still possible, on the basis of this signal, to take influence on the actuating force nominal value $F_{actF,nominal}$ and, above all, the nominal value of the actuating force gradient $\dot{F}_{actF,nominal}$, in a suitable fashion. Thus, there is the possibility of actuating the electric parking brake so that a) it is applied and released with maximum dynamics during standstill or at low vehicle speeds, and b) it is actuated and released with reduced dynamics or with defined actuating force gradients at medium and high vehicle speeds.

What is claimed is:

1. Method for actuating a parking brake which is electromechanically operable by an actuator by way of a force-transmitting element, the said actuator being composed of an electric motor and a self-locking gear which is interposed between the electric motor and the force-transmitting element, comprising the steps of:

evaluating a desired actuating force, an actuating force gradient, a current supplied to the actuator, and actuator position and, based upon the outcome of the evaluating step 1), determining a voltage that is to be applied to the actuator.

2. Method as claimed in claim 1, wherein the desired actuator position and a desired actuator rotational speed is associated with the desired actuating force and its gradient by function control and monitoring.

3. Method as claimed in claim 2, wherein the desired actuator rotational speed and the desired actuator position are subjected to a position control for producing a signal representative of the desired actuating current.

4. Method as claimed in claim 3, further including calculating the voltage that is to be applied to the actuator by evaluating the signal representative of a desired actuating current in consideration of a signal representative of a actuator rotational speed actual value.

5. Method as claimed in claim 4, further including applying a second voltage value to the actuator in dependence on a switching variable.

6. Method as claimed in claim 5, further including setting the switching variable by the position control.

7. Method as claimed in claim 5, further including setting the switching variable by the function control and monitoring.

8. System for actuation of a parking brake which is electromechanically operable by an actuator by way of a force-transmitting element, the said actuator being composed of an electric motor and a self-locking gear which is interposed between the electric motor and the force-transmitting element, comprising:

a function controlling and monitoring module which is provided with the nominal values of the actuating force and signals representative of the actuating force gradient, with a signal representative of the actuator position actual value, and a signal representative of the actuator current actual value, and which produces from the input quantities the nominal output value of the actuator speed, the nominal output value of the actuator position and the actual output value of the actuator rotational speed, a position controller which is furnished with input signals that correspond to the nominal and actual value of the actuator rotational speed, and the nominal and actual value of the actuator position, wherein said position controller provides the signal representative of an actuator current nominal value, and a calculating module in which the signal representative of the actuator current nominal value is converted into the signal representative of a voltage that is to be applied to the actuator, and in which there occurs a compensation of the opposing electromagnetic force generated by the actuator in consideration of the actual value of the actuator rotational speed.

9. System as claimed in claim 8, further including switching means connected downstream of the calculating module which permit applying a second voltage to the actuator in dependence on a switching variable.

10. System as claimed in claim 9, wherein the output signal of the switching means is sent to an electronic actuating circuit whose output signal is used to drive the actuator.

11. System as claimed in claim 8, wherein the position controller includes a three-point switch and a rotational speed controller which is connected downstream of the three-point switch, and the three-point switch predetermines in dependence on a position deviation a defined actuator rotational speed nominal value which is compared with the actuator rotational speed actual value, and the resulting deviation is sent as an input quantity to the rotational speed controller whose output quantity represents the actuator current nominal value.

12. System as claimed in claim 11, wherein the rotational speed controller is configured as a linear PI-controller.

13. System as claimed in claim 11, further including a two-point switch which is furnished as an input quantity with the position deviation and whose output quantity represents the switching variable.

14. System as claimed in claim 8, wherein the calculating module is composed of a module for the compensation of the electromagnetic opposing force and a limiter connected downstream of the module.

* * * * *